No. 779,290. Patented January 3, 1905.

UNITED STATES PATENT OFFICE.

IENS P. LIHME, OF CLEVELAND, OHIO, ASSIGNOR TO THE GRASSELLI CHEMICAL COMPANY, OF CLEVELAND, OHIO, A CORPORATION OF OHIO.

PROCESS OF MAKING SODIUM ACETATE.

SPECIFICATION forming part of Letters Patent No. 779,290, dated January 3, 1905.

Application filed July 5, 1904. Serial No. 215,401.

*To all whom it may concern:*

Be it known that I, IENS P. LIHME, a citizen of the United States of America, and a resident of Cleveland, in the county of Cuyahoga and State of Ohio, have invented certain new and useful Improvements in Processes of Manufacturing Sodium Acetate, of which the following is a specification.

My invention relates to improvements in processes for the manufacture of sodium acetate, and has for its object the production of a purified salt in accordance with a method much cheaper and more efficient than has previously been devised.

For years past a standard reaction for producing sodium acetate has involved the combination between solutions of calcium acetate and sodium sulfate. In conducting such reaction, however, considerable heating of the solutions, reaction with other chemicals, fusion, and repeated recrystallizations of the product necessarily have been resorted to.

Two classes of impurities—viz., organic impurities and inorganic salts—are present in the commercial ingredients from which the sodium acetate is made and present not a little difficulty in their elimination from the product. Long series of experiments have shown that the latter class of impurities is the most difficult to eliminate, the same consisting principally of calcium sulfate formed during the reaction and retained in solution by the relatively concentrated solution of sodium acetate. These experiments have conclusively developed the difficulty of producing a reasonably-pure sodium-acetate product in the presence of calcium sulfate. Accordingly I have modified the well-known and simple reaction in several particulars, conducing not only to material economies in the way of manufacture, but producing a purer and more marketable product than has previously been obtained by practicing other than laboratory methods. This I accomplish within the solution, entirely eliminating the undesirable sulfates from the product and removing the organic matter without having recourse to fusion, with its attendant losses, or to repeated recrystallizations.

Commercial sodium acetate prepared from sodium sulfate and calcium acetate in accordance with previously-practiced methods contains, besides organic impurities, relatively large proportions of calcium sulfate and calcium hydrate. Of these combining ingredients calcium acetate is quite impure, and while sodium sulfate is relatively purer the commercial article is naturally considerably below its theoretical basis of combination in the reaction. These considerations will of course be borne in mind by those practicing my process, which I will explain, assuming, however, that the calculations have been made to insure substantially the proportions of requisite salts involved in the reaction.

My process is conducted as follows: The commercial calcium acetate is dissolved in a large tank suitably heated to further complete solution and chemical reaction. Sodium sulfate is then added to this solution in quantities slightly in excess of that required to complete the reaction with the calcium salt, being thoroughly stirred meanwhile. This latter ingredient preferably is added in solid form, for the reason that the expense and labor of preparing a separate solution and subsequent concentration thereof are avoided, and, further, the resulting precipitation of calcium sulfate appears to possess greater efficiency in seizing upon the organic impurities and removing them from the solution. The said solution is further heated to insure the completion of the reaction, after which barium carbonate is added to the solution, which may or may not be separated from the precipitated calcium sulfate in order to throw down the percentage of that salt remaining dissolved in the acetate solution, it being found that the resulting calcium carbonate and barium sulfate are practically insoluble in said solution. The heating is continued during this last reaction, which results in the precipitate seizing upon further portions of organic matter and carrying the same down, to the end that the acetate solution is practically freed therefrom. These two reactions described leave a highly-purified solution of sodium acetate, with a fractional percentage of sodium carbonate, which is negligible. Sodium sulfate, however, is entirely eliminated from the mother-liquor, and this is a point of much importance in the manufacture of sodium acetate. The decanted solution is run into concentrating-tanks, where it is again heated and slowly evaporated until ready to crystallize, whereupon it is conducted to crystallizing-tanks. Jets of air are constantly supplied to the solution during this step of the process, extending over some forty-eight hours, if necessary, which serves to cool the solution and oxidize practically all of the organic impurities that may remain after the foregoing steps.

A slightly-discolored product or salt is obtained from the above; but this rarely is used, however, and preferably I free these crystals from the mother-liquor in a centrifugal machine or drier and merely recrystallize the sodium acetate for the purpose of producing a clear and commercially-pure product.

The residue and precipitate from the foregoing reactions may be washed to dissolve out the sodium acetate, and this water subsequently finds employment in dissolving further portions of calcium acetate. The mother-liquor from the centrifugal machine and from the crystallizing-tank also is transferred to the initial dissolving-tank.

Undoubtedly the reactions and steps above explained will be perfectly clear and I need only supply the formulæ and an example below to indicate graphically what I accomplish by my improved process. Thus to a solution containing one hundred and fifty-eight pounds of calcium acetate one hundred and forty-two pounds of sodium sulfate will be added and the initial reaction occurs as indicated by the following formula although it is to be remembered that in practice the latter ingredient preferably is present in excess to the extent of about five per cent.:

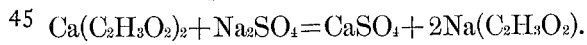
$$Ca(C_2H_3O_2)_2 + Na_2SO_4 = CaSO_4 + 2Na(C_2H_3O_2).$$

The addition of barium carbonate to the foregoing solution results, as stated, in the precipitation of the dissolved calcium sulfate and of the excess of sodium sulfate in accordance with the following reaction:

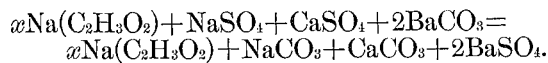
$$xNa(C_2H_3O_2) + NaSO_4 + CaSO_4 + 2BaCO_3 = xNa(C_2H_3O_2) + NaCO_3 + CaCO_3 + 2BaSO_4.$$

In the example cited approximately twelve pounds of barium carbonate would be required to throw down not only the dissolved calcium sulfate, but also to combine with the excess of sodium sulfate added to insure complete reaction.

It will be seen that my process as outlined eliminates not only the organic impurities, but the undesirable salts remaining with the sodium acetate, and this without making unnecessary solutions and without fusion, which results in a loss and conversion into acetones, amounting to about ten per cent. of the product. Moreover, the process is one demanding no special apparatus or unusual care and time in completing the same and commends itself commercially in several other particulars, which will be appreciated by manufacturing chemists. It may be mentioned, however, that another impurity not infrequently met with in the manufacture of sodium acetate is magnesium sulfate, which similarly remains in solution with the sodium acetate when the solution is heated and sufficiently concentrated, and accordingly this impurity is likewise disposed of by reason of its precipitation by the barium in its less soluble form or magnesium carbonate.

Having now set forth and exemplified the preferred process for manufacturing sodium acetate, I claim as new, and desire to secure by Letters Patent, the following, together with such modifications as will occur to those skilled in the art:

1. The process substantially as herein set forth, for producing sodium acetate, which consists in subjecting a solution containing calcium acetate to an excess of sodium sulfate, converting such excess of the sodium salt and the dissolved calcium sulfate produced, into carbonates, by the addition of barium carbonate, concentrating the solution, subjecting it to an oxidizing medium, and effecting the crystallization of the sodium acetate.

2. The process substantially as herein set forth, for producing sodium acetate, consisting in treating a solution containing calcium acetate, with a slight excess of sodium sulfate added in crystalline form to such solution, thereafter adding barium carbonate in quantity sufficient to combine with the excess of sodium sulfate, and with the calcium sulfate held in the acetate solution, meanwhile heating the solution to further the chemical reactions, further heating said solution to secure crystallization, and thereafter crystallizing the sodium acetate in the presence of an oxidizing medium.

3. The process substantially as herein set forth, for manufacturing and purifying sodium acetate, which consists in adding an excess of sodium sulfate to a heated solution containing calcium acetate, thereafter adding barium carbonate in quantity sufficient to precipitate the sulfates in solution, as of sodium, calcium and magnesium, concentrating the decanted solution, subjecting the same to a free supply of air, and crystallizing or recrystallizing the sodium acetate thus produced.

4. The process substantially as herein set forth, for producing sodium acetate from a single solution and without fusion, which consists in treating a hot calcium-acetate solution with an excess of sodium sulfate in a dry state, or crystals, to insure complete reaction, then adding barium carbonate in quantity calculated to combine with the dissolved sulfates and adhere to the organic matter, still heating the solution, concentrating or evaporating the solution, oxidizing the impurities in the presence of a free supply of air, and finally crystallizing or recrystallizing the purified sodium acetate thus produced.

5. The process of purifying solutions of the character described, consisting in precipitating all the sulfate groups therein, by adding barium carbonate, and subjecting the organic impurities in solution to an oxidizing agent, substantially as set forth.

6. The process of purifying acetates without fusion, consisting in precipitating from the solution thereof all the sulfate groups, by adding a slight excess of barium carbonate, and directing currents of air throughout the solution to oxidize the organic impurities therein, substantially as set forth.

7. In the manufacture of sodium acetate or similar salts, the step or process of removing the organic matter, which consists in directing currents of air through the solution, during the course of crystallization of the salt, substantially as set forth.

8. In the manufacture of sodium acetate or similar salts, the step or process of removing portions of the organic matter and the suspended or dissolved sulfates, consisting in adding to the solution to be treated, an excess of barium carbonate, whereby the impurities are precipitated, substantially as set forth.

9. In the manufacture of sodium acetate, the process substantially as described, comprising the reaction of sodium sulfate upon calcium acetate in a heated solution, and the subsequent addition thereto of an excess of barium carbonate, whereby the sodium acetate thus produced is freed from dissolved or suspended sulfates.

Signed at Cleveland, this 1st day of July, 1904, in the presence of two subscribing witnesses.

IENS P. LIHME.

Witnesses:
JOHN F. McDONNELL,
ALBERT LYNN LAWRENCE.